Sept. 21, 1948.    H. T. KRAFT    2,449,606
FLEXIBLE COVER FOR TIRE REPAIR VULCANIZERS
AND METHOD OF MAKING
Filed Dec. 7, 1945    6 Sheets-Sheet 1
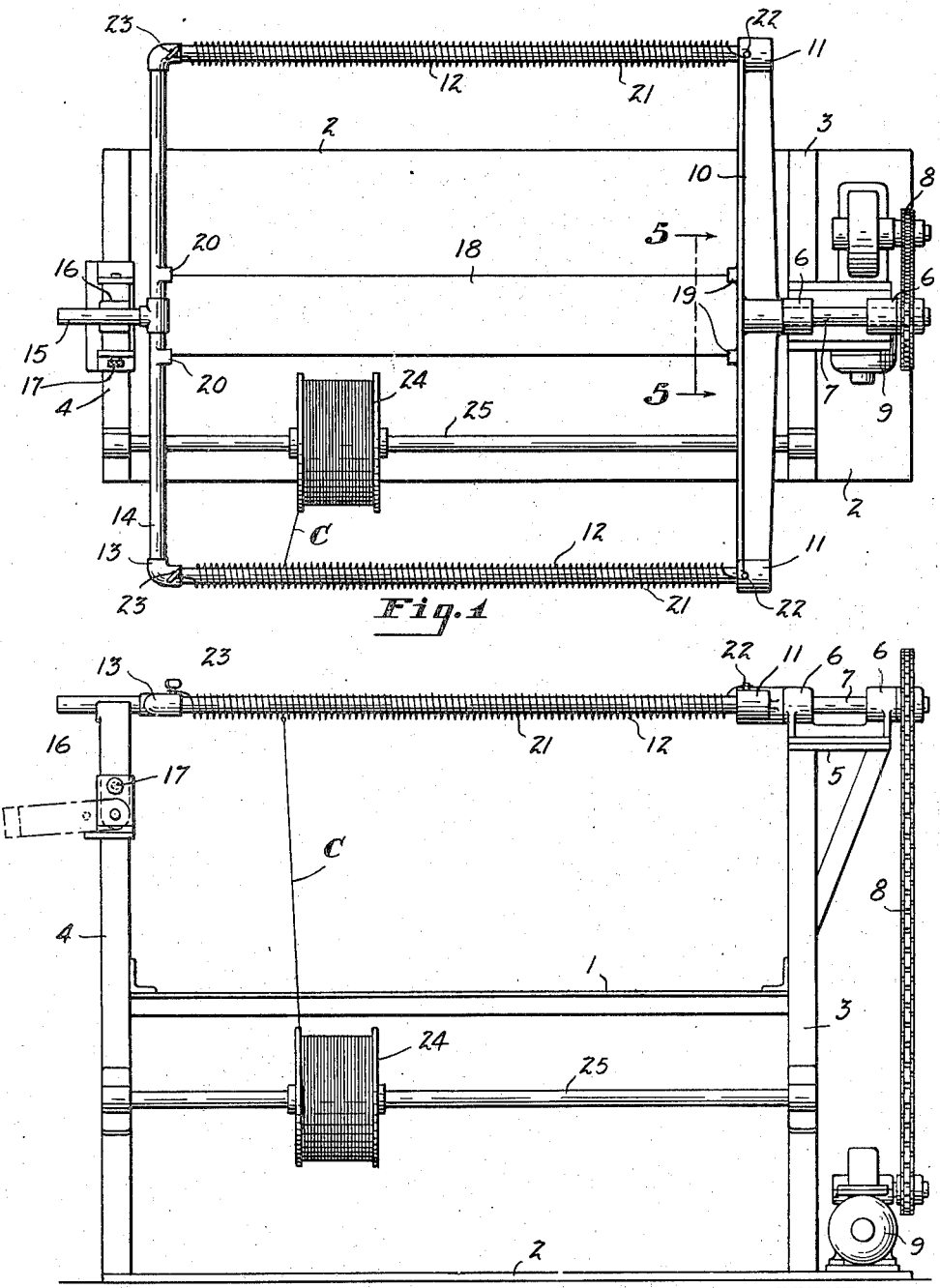
INVENTOR.
Herman T. Kraft
BY
Evans & McCoy
ATTORNEYS Sept. 21, 1948. H. T. KRAFT 2,449,606
FLEXIBLE COVER FOR TIRE REPAIR VULCANIZERS
AND METHOD OF MAKING
Filed Dec. 7, 1945 6 Sheets-Sheet 2

INVENTOR.
Herman T. Kraft
BY
Evans + McCoy
ATTORNEYS

Sept. 21, 1948. H. T. KRAFT 2,449,606
FLEXIBLE COVER FOR TIRE REPAIR VULCANIZERS
AND METHOD OF MAKING
Filed Dec. 7, 1945 6 Sheets-Sheet 3
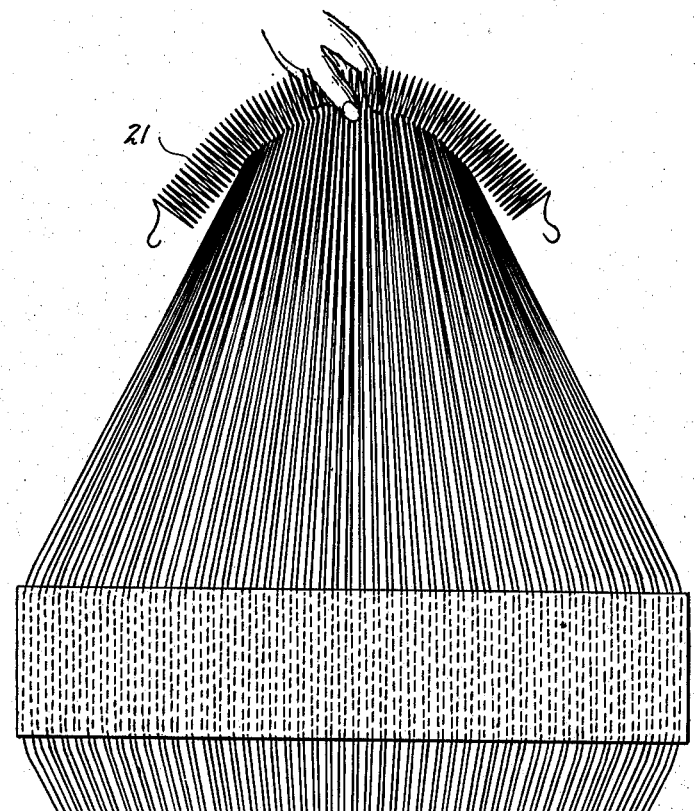
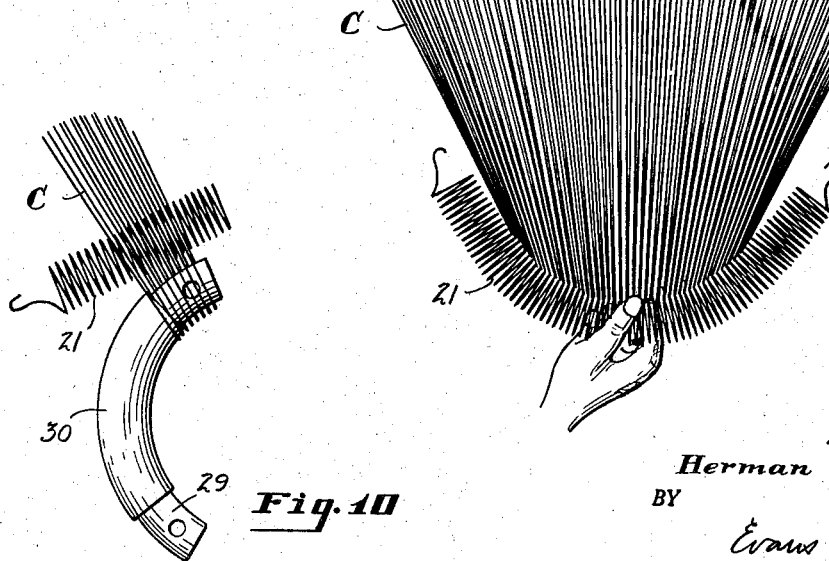
INVENTOR.
Herman T. Kraft
BY
Evans + McCoy
ATTORNEYS Sept. 21, 1948.   H. T. KRAFT   2,449,606
FLEXIBLE COVER FOR TIRE REPAIR VULCANIZERS
AND METHOD OF MAKING
Filed Dec. 7, 1945   6 Sheets-Sheet 4

INVENTOR.
Herman T. Kraft
BY
Evans + McCoy
ATTORNEYS

Sept. 21, 1948.  H. T. KRAFT  2,449,606
FLEXIBLE COVER FOR TIRE REPAIR VULCANIZERS
AND METHOD OF MAKING
Filed Dec. 7, 1945  6 Sheets-Sheet 5
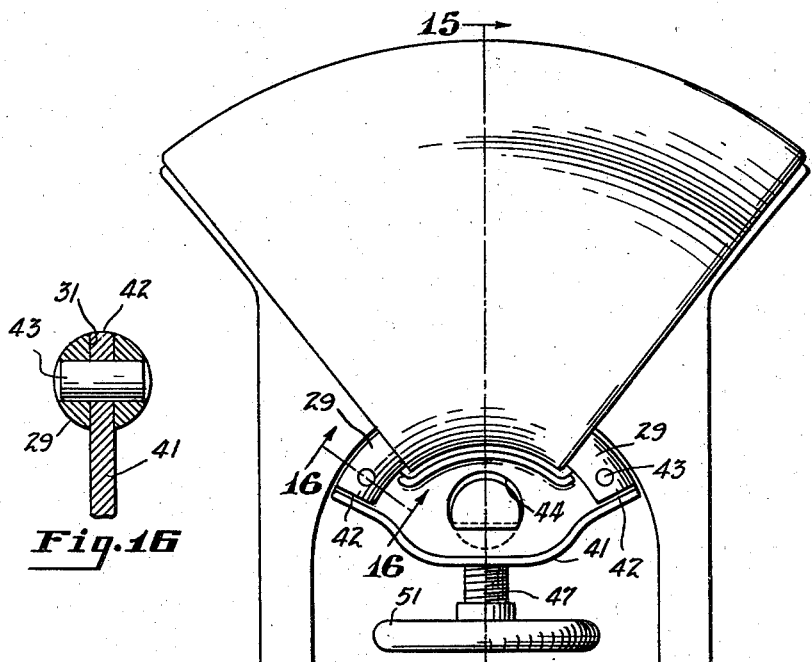
Fig.16
Fig.14
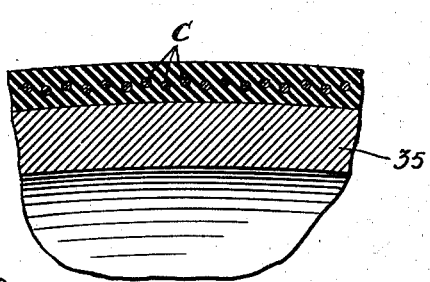
Fig.17
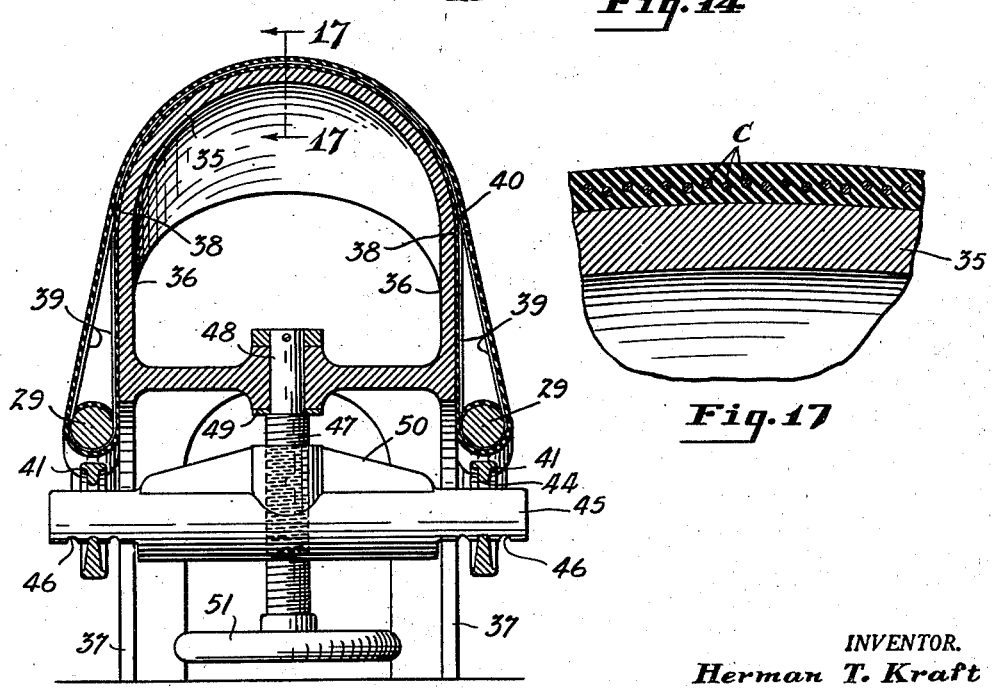
Fig.15
INVENTOR.
Herman T. Kraft
BY
Evans + McCoy
ATTORNEYS

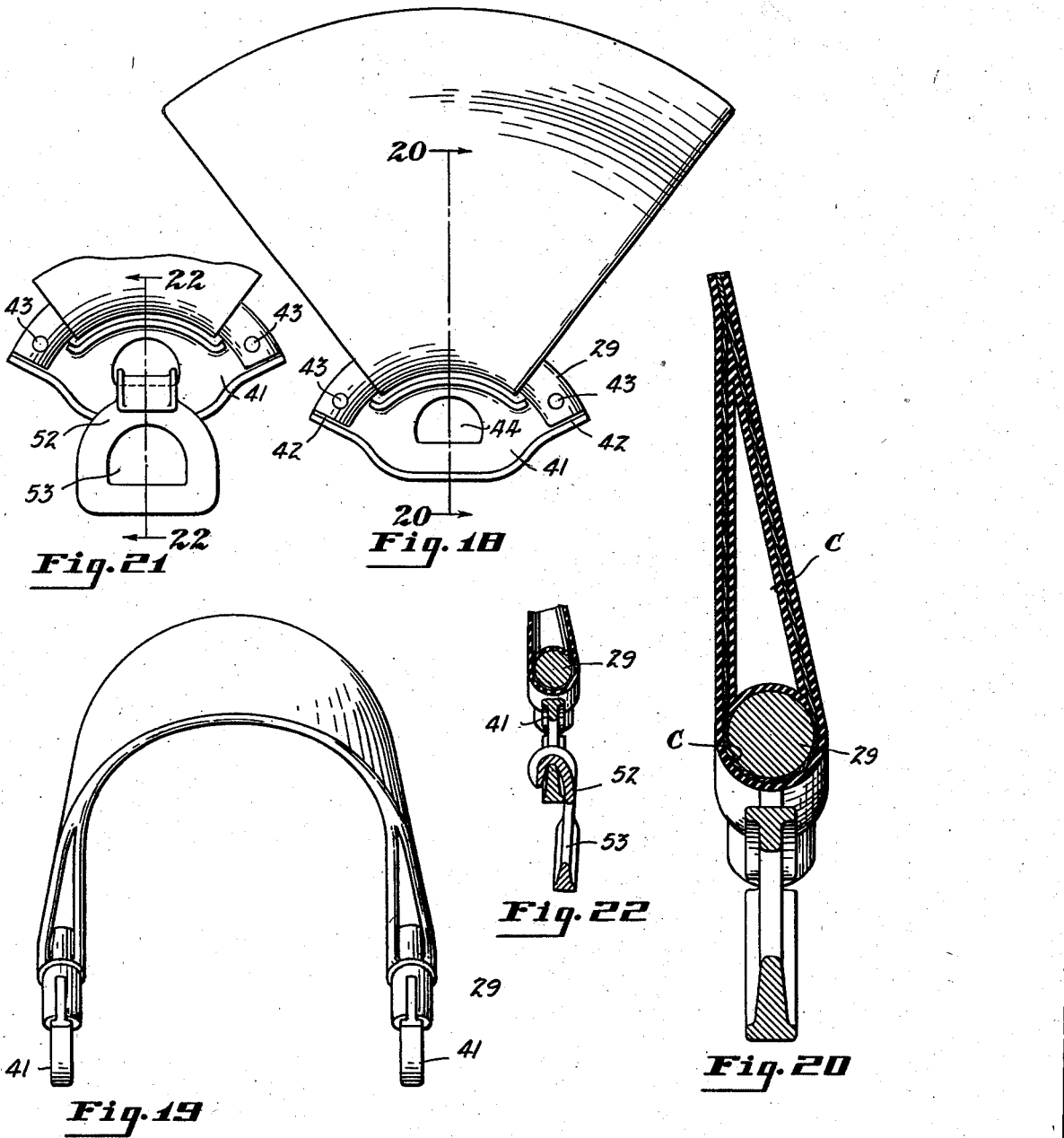

Patented Sept. 21, 1948

2,449,606

UNITED STATES PATENT OFFICE 2,449,606

FLEXIBLE COVER FOR TIRE REPAIR VULCANIZERS AND METHOD OF MAKING

Herman T. Kraft, Akron, Ohio, assignor to The General Tire & Rubber Company, Akron, Ohio, a corporation of Ohio Application December 7, 1945, Serial No. 633,427

8 Claims. (Cl. 18—18)

This invention relates to flexible covers for tire repair vulcanizers and to the method of making the same.

The invention has for an object to provide a flexible vulcanizer cover for confining an inflatable bag that contacts exteriorly with the tire casings being repaired, that is light in weight and flexible, but possessed of great tensile strength so that it can withstand the pull caused by the radial thrust of the inflatable bag subjected to a high inflation pressure.

A further object of the invention is to provide a flexible rubber cover that is reinforced with high tensile material such as steel cable in the form of wire or composed of twisted strands of wire and which has anchoring members at the end thereof that are mounted in loops of the reinforcing cable so that the tension on the cover which creates a radial pressure on the tire casing is applied directly to the steel cables.

An additional object of the invention is to provide a method of making a flexible rubber cover that is reinforced by a continuous strand of cable extending back and forth in closely spaced convolutions from one end of the cover to the other.

With the above and other objects in view, the invention may be said to comprise the cover and method of making the same as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a top plan view of a cable winding machine designed for use in forming flat helically disposed closely spaced convolutions of reinforcing cable;

Fig. 2 is a side elevation of the machine shown in Fig. 1;

Fig. 9 is a plan view of the reinforcing cable after it is removed from the winding machine;

Fig. 10 is a fragmentary view illustrating the insertion of the anchoring bar into the cable loops and the removing of the spacing spring;

Fig. 14 is a side elevation showing a completed cover held under tension on the form in position for vulcanizing;

Fig. 15 is a transverse section taken on the line indicated at 15—15 in Fig. 14;

Fig. 16 is a section on an enlarged scale taken on the line indicated at 16—16 in Fig. 14;

Fig. 17 is a fragmentary section taken on the line indicated at 17—17 in Fig. 15;

Fig. 18 is a side elevation of a cover embodying the invention;

Fig. 19 is an end elevation of the cover;

Fig. 20 is a fragmentary section on an enlarged scale taken on the line indicated at 20—20 in Fig. 18;

Fig. 21 is a fragmentary side elevation of one end of the cover showing an adapter hook attached to the anchoring plate, and Fig. 22 is a section taken on the line indicated at 22—22 in Fig. 21.

Figure 3:
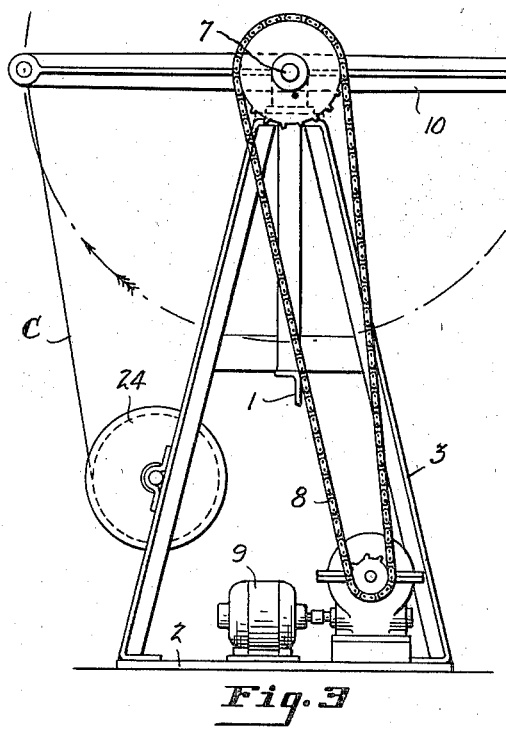
Fig. 3 is an end elevation of the machine shown in Fig. 1.
Figure 4:
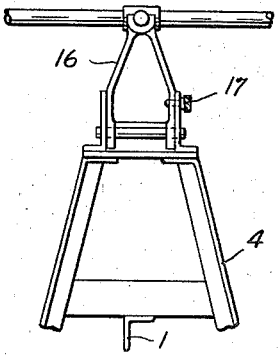
Fig. 4 is a fragmentary end elevation looking toward the opposite end from that shown in Fig. 3 and showing a pivoted shaft support.
Figure 5:
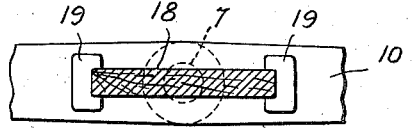
Fig. 5 is a section taken on the line indicated at 5—5 in Fig. 1.
Figure 6:
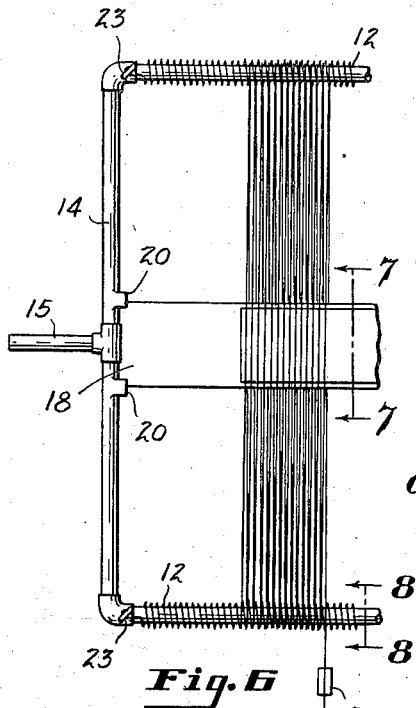
Fig. 6 is a fragmentary plan view showing the cable winding spider removed from the machine.

The cover of the present invention is a thin, flexible rubber cover that is built upon a reinforcing skeleton that is composed of a strand of steel cable extending back and forth in closely spaced convolutions from one end of the cover to the other. In building the cover the initial step consists in forming the steel cable skeleton by winding the cable helically on a wide transversely flat form, applying rubber to the central portion of the flat helix to hold the central portions of the convolutions in spaced relation, bringing the end portions of the convolutions closer together and applying a covering of rubber over the entire skeleton.

In the initial operation the cable is wound in closely spaced convolutions that are substantially flat and of a length corresponding to the length of the covering to be formed. This winding operation is performed upon a machine such as shown in Figs. 1 to 8 in which the mechanism is mounted on a frame 1 which comprises a base 2 and end standards 3 and 4. The standard 3 has a bracket 5 at the upper end thereof which supports bearings 6 for a horizontal shaft 7 that may be driven through a sprocket chain 8 by a suitable motor 9 which may be an electric motor driving the sprocket 8 through suitable reduction gearing. To the inner end of the shaft 7 there is attached a cross arm 10 that forms one end of a flat reel, the cross arm 10 having sockets 11 at its oppposite ends that are equally spaced from the shaft 7 and that receive the ends of elongated tubular bars 12 that engage at their opposite ends in sockets 13 carried by opposite ends of a cross arm 14 that forms the opposite end of the reel. The cross arm 14 has a short shaft 15 that is axially alined with the shaft 7 and that seats in the top of a short bearing post 16 that is releasably held in vertical position by means of a locking pin 17.

The flat reel has a longitudinal plate 18 midway between the bars 12 that is attached centrally to the cross arms 10 and 14 by means of socket members 19 and 20 in which the ends of the plate fit. Coil springs 21 are mounted upon the tubular bars 12 and are held in stretched condition on the bars by means of pins 22 and 23 attached to the sockets 11 and 13 to which the ends of the spring are attached.

A drum 24 that is slidably mounted on a horizontal shaft 25 on the frame 1 carries a supply of cable C sufficient to form the reinforcement for one or more covers and this cable is fed to the winding frame through a suitable guide 26 which may be moved along one of the bars 12 to lay successive convolutions of the cable C in successive spaces between the coils of the spring 21. At the start of the winding operation the cable C is drawn from the drum 24 and attached to one end of one of the bars 12 and the winding frame is then rotated by means of the motor 9, causing the cable from drum 24 to be wound over the flat reel formed by the spaced bars 12 in flat elongated helical convolutions. The rotation of the drum 24 will be retarded frictionally to keep the cable C taut while it is being wound on the frame and the convolutions will be evenly spaced by means of the guide 26 which may be operated manually or by a suitable level winding mechanism.

Figure 7:
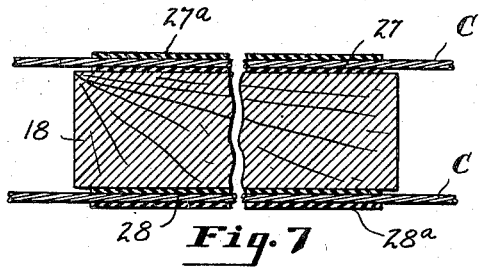
Fig. 7 is a transverse section taken on the line indicated at 7—7 in Fig. 6, the section being on an enlarged scale.
Figure 8:
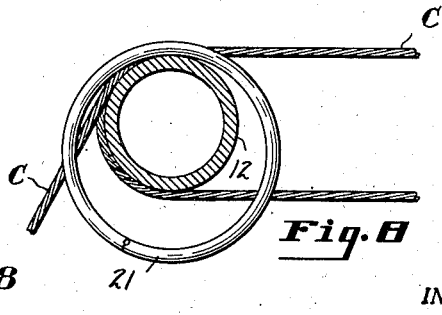
Fig. 8 is a section on an enlarged scale taken on the line indicated at 8—8 in Fig. 6.
Figure 11:
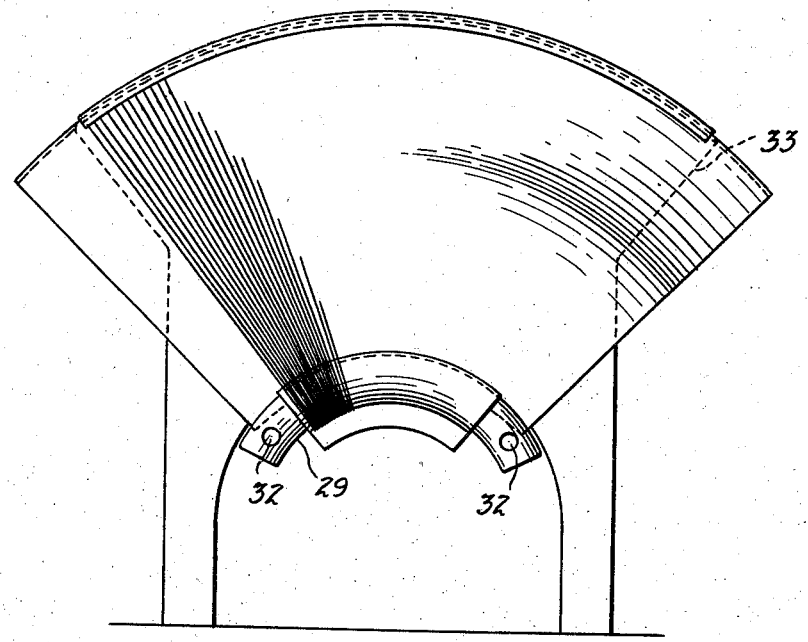
Fig. 11 is a side elevation illustrating the initial operation on the skeleton cover on a building form.
Figures 12, 13:
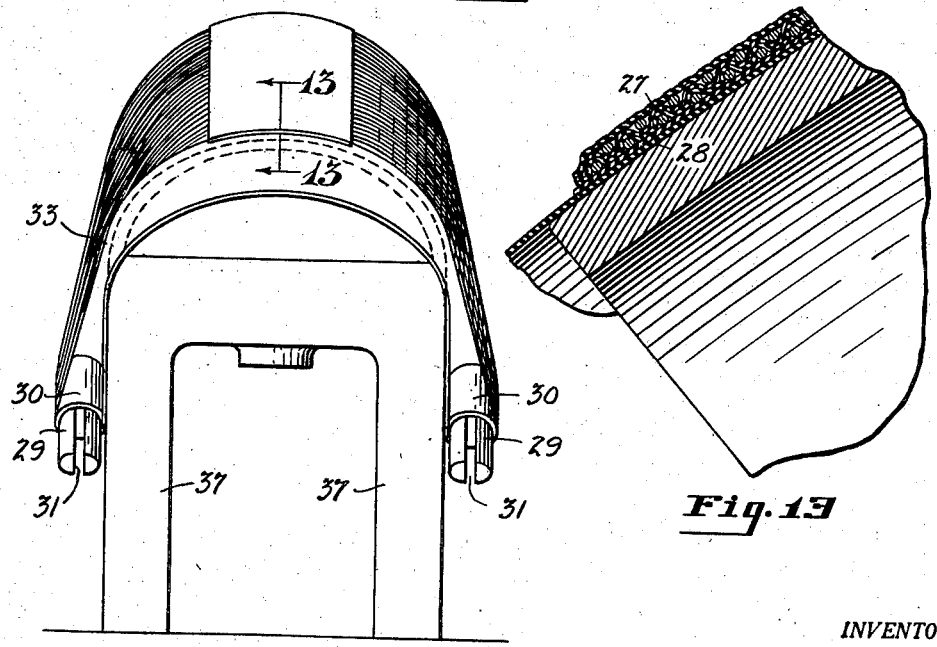
Fig. 12 is an end elevation of the form and skeleton cover shown in Fig. 11.
Fig. 13 is a fragmentary section on an enlarged scale taken on the line indicated at 13—13 in Fig. 12.

Prior to the winding operation strips of unvulcanized rubber 27 and 28 are adhered to the top and bottom faces of the center plate 18 so that the windings of the cable C will pass above and below the rubber sheets. After a sufficient length of cable has been wound upon the reel the central portions of the convolutions are pressed into the rubber sheets 27 and 28 and additional sheets of rubber 27a and 28a are applied exteriorly as shown in Fig. 7 to embed the convolutions of the cable in rubber and maintain them in proper spaced relation during subsequent operations. The bearing post 16 is then swung down out of the way and the cross arm 14 of the reel is removed after the spring 21 has been detached from the pins 22 and 23, after which the center plate 18 is removed and the convolutions of the cable C attached at their ends to the coil springs 21 are removed from the bars 12. The contraction of the springs 21 pulls the end loops of the cable convolutions closer together, as shown in Fig. 9, while the central portions of the convolutions are held to their original spacing by means of the rubber strips 27 and 28. The coil springs 21 may then be shifted inwardly away from the ends of the cable loops and short arcuate anchoring bars 29 may be entered into the loops, each bar 29 preferably having a covering of unvulcanized rubber 30 in which the portions of the coils extending around the anchoring bar 29 are embedded in subsequent operations. The bars 29 have projecting ends 31 provided with slots 32 for attachment to suitable anchoring members. After the bars 29 are inserted in the loops of the cable the springs 21 may be removed by pulling them endwise or by screwing them out from between the windings of the cable.

After the anchoring bars are placed in opposite ends of the cover skeleton formed by the reinforcing cable, this skeleton is placed upon a building form 33 that has a transversely rounded longitudinally arcuate top 35 that conforms to the interior of the central portion of the finished cover. The form also has vertical side walls 36 against which the end portions of the cover may be placed and is supported at a convenient height by suitable supporting legs 37.

Before the reinforcing skeleton is placed upon the building form, a covering of unvulcanized sheet rubber 38 is placed over the top and side walls 35 and 36 of the form, the rubber sheet 38 being of a size to form the interior face of the vulcanizer cover. Strips of unvulcanized rubber 39 are then placed inside the loops of the cable C above the anchoring bars 29 and an outer covering 40 of unvulcanized rubber is applied over the entire exterior surface of the cover.

Anchoring plates 41 have arms 42 at the ends thereof that fit in the diametrical slots 32 in the ends of the anchoring bars 29 and which are rigidly attached to the anchoring bars by suitable pins or rivets 43. Each anchoring plate 41 has a central opening 44 and the openings of these plates are adapted to receive the ends of a transverse bar 45 that has positioning notches 46 on its under edge at the opposite ends for engagement with the plate 41. The bar 45 is a tension applying member that is actuated by means of a screw 47 that has a reduced upper end portion 48 journaled in the form 33 and which is provided with a thrust shoulder 49 that engages the form 33. The screw 47 has threaded engagement with a thrust member 50 that engages the top of the bar 45 and is operated by a hand wheel 51 to draw the cover tightly against the surface of the form 33. The cover is vulcanized in an open oven while held under considerable tension, the vulcanization being the final step in the manufacturing process.

The vulcanizer cover formed by the method above described is a light and flexible cover, which has great tensile strength due to the fact that the anchoring members are directly attached to the reinforcing cable so that it is capable of withstanding the tension to which it is subjected when an inflatable bag confined between the cover and the exterior of a tire casing is subjected to a high inflation pressure.

The ends of the cover are adapted to be anchored to a suitable vulcanizer support by means of the anchoring plates 41, the plates 41 being engageable with suitable anchoring and tensioning applying members carried by the vulcanizer support, or to be connected to such anchoring members by means of an adaptor hook 52 such as shown in Figs. 21 and 22, the adaptor hook being engageable in the opening 44 of the anchoring plate 41 and being provided with a similar opening 53 for engagement with the anchoring members.

It is to be understood that variations and modifications of the specific devices herein shown and described for purposes of illustration, may be made without departing from the spirit of the invention.

What I claim is:

1. A flexible cover for a tire repair vulcanizer comprising a rubber body molded to arch form, rigid bars at the ends of said body, and a steel wire reinforcing cable in said body extending back and forth in a series of convolutions from one end thereof to the other and looped over said bars.

2. A flexible cover for a tire repair vulcanizer comprising a rubber body molded to arch form, rigid bars at the ends of said body, and a steel wire reinforcing cable in said body extending back and forth in a series of convolutions from one end thereof to the other and looped over said bars, said convolutions converging from the central portion of the rubber body to the ends thereof.

3. A flexible cover for a tire repair vulcanizer comprising a rubber body molded to arch form, rigid bars at the ends of said body, a steel wire reinforcing cable in said body extending back and forth in a series of convolutions and looped over said bars, and anchoring members attached to said bars.

4. The herein described method of making a flexible tire vulcanizer cover which comprises winding a cable in substantially flat parallel helical convolutions about spaced parallel bars, applying rubber to the convolutions midway between said bars to hold the center portions in spaced relation, bringing the ends of the convolutions closer together, removing the said bars and inserting relatively short bars in the loops of said cable, covering the remainder of the cables with rubber, and vulcanizing.

5. The herein described method of making a flexible tire vulcanizer cover which comprises winding a cable in substantially flat parallel helical convolutions about spaced parallel bars, applying rubber to the convolutions midway between said bars to hold the center portions in spaced relation, bringing the ends of the convolutions closer together, removing the said bars and inserting relatively short bars in the loops of said cable, covering the remainder of the cables with rubber, placing the cover upon an arcuate form with the ends thereof extending radially inwardly, applying radial tension to the ends of the cover, and vulcanizing.

6. The herein described method of making a flexible tire vulcanizer cover which comprises winding a steel cable in substantially flat closely spaced helical convolutions about spaced parallel bars, applying a strip of rubber to the interior of the convolutions midway between said bars to hold the center portions in spaced relation, bringing the ends of the convolutions closer together, removing said bars from the loops of the convolutions, inserting short bars in said loops, covering the remainder of the cable with rubber, and vulcanizing the cover while it is held under tension.

7. The herein described method of making a flexible tire vulcanizer cover which comprises winding a steel cable in substantially flat closely spaced helical convolutions about spaced parallel bars, applying a strip of rubber to the interior of the convolutions midway between said bars to hold the center portions in spaced relation, bringing the ends of the convolutions closer together, removing said bars from the loops of the convolutions, inserting short bars in said loops, completing the cover by covering the cable with rubber, and vulcanizing the cover on an arcuate form with the ends thereof extending inwardly on opposite sides of the form and while radial tension is applied to the ends of the cover.

8. The herein described method of making a flexible tire vulcanizer cover which comprises winding a steel cable in closely spaced helical convolutions about spaced parallel bars each having a stretched coil spring thereon so that successive convolutions of the cable lie between successive convolutions of the spring, fixing the central portions of the cable convolutions by adhering thereto a strip of rubber, releasing the ends of the coil springs to cause the ends of the cable convolutions to be drawn closer together, removing the bars, inserting short bars in the loops of the cable, removing the coil springs, completing the cover by covering the cable with rubber, and vulcanizing said cover while it is held under tension.

HERMAN T. KRAFT.

REFERENCES CITED

The following references are of record in the file of this patent:

UNITED STATES PATENTS

| Number | Name | Date |
|---|---|---|
| 1,317,124 | Booth | Sept. 23, 1919 |
| 1,623,677 | Heintz | Apr. 5, 1927 |
| 1,923,736 | Lewis et al. | Aug. 22, 1933 |
| 2,112,440 | James | Mar. 29, 1938 |
| 2,344,158 | Maze | Mar. 14, 1944 |
| 2,411,558 | Semler | Nov. 26, 1946 |